United States Patent [19]

Stewart

[11] Patent Number: 4,912,166

[45] Date of Patent: Mar. 27, 1990

[54] CURABLE BLENDS OF FLUOROELASTOMER AND POLY(ETHER-KETONE-KETONE)

[75] Inventor: Charles W. Stewart, Newark, Del.

[73] Assignee: E. I. Du Pont de Nemours and Company, Wilmington, Del.

[21] Appl. No.: 261,738

[22] Filed: Oct. 26, 1988

Related U.S. Application Data

[63] Continuation-in-part of Ser. No. 135,097, Dec. 18, 1987, abandoned.

[51] Int. Cl.[4] ............ C08L 71/00; C08L 27/12
[52] U.S. Cl. ............ 525/151; 525/153; 525/146; 524/508
[58] Field of Search ............ 525/146, 151, 153; 524/508

[56] References Cited

U.S. PATENT DOCUMENTS

| 4,546,141 | 10/1985 | Gebauer | 524/401 |
| 4,578,427 | 3/1966 | Saito | 525/151 |
| 4,610,918 | 9/1986 | Effenberger | 428/422 |

FOREIGN PATENT DOCUMENTS

0192397  6/1986  European Pat. Off. ............ 525/151

OTHER PUBLICATIONS

CPI Prior Art Search Ref. No. P-86-4497-N.

Primary Examiner—Lewis T. Jacobs
Assistant Examiner—David Buttner

[57] ABSTRACT

A blend of tetrafluoroethylene and a poly(oxy-p-phenyleneisophthaloyl-phenylene/oxy-p-phenyleneterephthaloyl- p-phenylene) (PEKK) results in improved processing of the fluoroelastomer at temperatures below the melting temperature of the PEKK and improves physical properties of cured fluoroelastomer.

7 Claims, No Drawings

CURABLE BLENDS OF FLUOROELASTOMER AND POLY(ETHER-KETONE-KETONE)

CROSS REFERENCE TO RELATED APPLICATION

This is a continuation-in-part of application Serial No. 135,097 filed Dec. 18, 1987 and expressly abandoned under the provisions of 37 CFR 1.62.

BACKGROUND

Fluoroelastomers exhibit a very high value in use. However, some are difficult to process and several physical properties may be inferior to those of more conventional elastomers. In order to overcome these deficiencies it is sometimes desirable to blend fluoroelastomers with other polymers to modify their properties.

SUMMARY OF THE INVENTION

This invention comprises a blend of
(a) about 100 parts of a fluoroelastomer consisting essentially of
 (i) 55 to 58 wt. % tetrafluoroethylene (TFE),
 (ii) 0.4 to 2.0 wt. % of a fluorinated organic comonomer that contains cure sites,
 (iii) 42 to 45 wt. % perfluoromethyl vinyl ether (PMVE), and
(b) 5–50 parts of a copolymer having as polymer repeat units (oxy-p-phenyleneterephthaloyl-p-phenylene) and (oxy-p-phenyleneisophthaloyl-p-phenylene), the ratio of tere-isomer to iso-isomer being within the range 60:40 to 80:20, the copolymer having a inherent visocity of greater than 0.4 and hereinafter being referred to as "PEKK."

The addition of PEKK to the fluoroelastomer improves processing of the uncured fluoroelastomer at temperatures below the melting temperature of the PEKK and improves physical properties of the cured fluoroelastomer.

DESCRIPTION OF THE INVENTION

The fluoroelastomer used in this invention is capable of being crosslinked. The cure site comonomer (ii) can be vinylidene fluoride, trifluoroethylene, vinyl fluoride, $CH_2=CHR_f$ where $R_f$ is a perfluoroalkyl group containing from 1–5 carbon atoms, perfluorophenoxy substituted perfluoroalkylene vinyl ethers wherein the perfluoroalkylene group contains from 1–5 carbon atoms, $NC(R'_f-O)_nCF=CF_1$ where $R'_f$ is a perfluoroalkylene group of 2–3 carbon atoms and n is 1–4, fluoroolefins of 2–5 carbon atoms containing 1 or 2 bromo substituents or fluoroolefins of 2–5 carbon atoms containing 1 or 2 iodo substituents. It is sufficiently thermally stable to survive processing above the melt temperature of the thermoplastic PEKK. The useful level of thermoplastic PEKK is from 5 parts to 50 parts per about 100 parts of fluoroelastomer. The preferred range is from 5 parts to 30 parts thermoplastic PEKK copolymer per about 100 parts of fluoroelastomer. The composition consists of finely divided thermoplastic PEKK dispersed in a matrix of amorphous fluoroelastomer. Particle size of the thermoplastic particles is less than about 10 microns.

The thermoplastic PEKK copolymer is blended into the elastomer at a sufficiently high temperature to melt the thermoplastic copolymer (usually above 300° C.). This results in a homogeneous, optically clear composition in which the copolymer may be at least partially dissolved in the elastomeric matrix. The mixture is cooled to below 100° C. and typical chemical curing ingredients known to cure the specific fluoroelastomer are mixed into the blend using standard techniques. The composition is then processed, cured and post cured using standard conditions for fluoroelastomers. During the cure and post cure operations, the thermoplastic copolymer phase remains separated in distinct particles, more or less spherical in shape, which are visible using an optical microscope.

The particular curing agent used will depend on the cure site monomer. The fluoroelastomers using bromo- and iodo-containing cure site monomers can be cured with peroxides, such as 2,5-dimethyl-2,5-di(t-butylperoxy)hexane. The fluoroelastomers containing the hydrogen cure site monomers can be cured using a bisphenol salt and a catalyst for the reaction, such as hexaoxatricyclohexaecosane. The fluoroelastomers containing the phenoxy group cure site monomers can also be cured using the bisphenol salt plus catalyst system. The fluoroelastomers containing the nitrile cure sites can be cured using tetraphenyl tin. The curing agent should be used in a molar amount appropriate for the number of cure sites present. In addition, reinforcing fillers as are known in the art can be present.

EXAMPLES

Example 1

100 Parts of the fluoroelastomer TFE/perfluoromethyl vinyl ether/vinylidene fluoride copolymer (55.4/44.2/0.4 wt %) was blended with 25 parts of the copolymer having repeat units of (oxy-p-phenyleneterephthaloyl-p-phenylene) and (oxy-p-phenyleneisophthaloyl-p-phenylene) (PEKK) having a 70:30 tere-isomer to iso-isomer ratio and an inherent viscosity of 0.87, measured at 23° C. and a concentration of 0.5% by weight in concentrated sulfuric acid. The uniform blend was removed from the Plastograph, cooled to 25° C. and then compounded on a two-roll rubber mill using the following formulation: 125 parts of above blend, 10 parts SAF carbon black, 4 parts lead oxide, 3 parts dipotassium salt of bisphenol AF, 4 parts DCH-18-Crown-6.

EXAMPLE 2

The same fluoroelastomer used in Example 1 was blended in a Brabender Plastograph at 340° C. with the same PEKK copolymer at the level of 50 parts PEKK to 100 parts fluoroelastomer. The uniform blend was removed from the Plastograph, cooled to 25° C. and then compounded on a two-roll rubber mill using the following formulation: 150 parts of above blend, 10 parts SAF carbon black, 4 parts lead oxide, 3 parts dipotassium salt of bisphenol AF, 4 parts DCH-18-Crown-6.

Control A

As a control, the same fluoroelastomer used in Examples 1 and 2 was blended with curing ingredients on a rubber mill at 100° C. No PEKK was added to this composition. The formulation was as follows: 100 parts of the fluoroelastomer, 10 parts SAF carbon black, 4 parts lead oxide, 3 parts dipotassium salt of bisphenol AF, 4 parts DCH-18-Crown-6.

It was observed that compositions of Examples 1 and 2 exhibited improved processing behavior over the control. These compositions were easier to band on the mill and the curing ingredients were more readily incorporated.

The above three compounds were sheeted out, pressed into 0.2 cm thick slabs, cured at 177° C. for 30 minutes and post cured for two days under nitrogen at 288° C. Test pieces were cut from the slabs and were subjected to tensile tests (ASTM D-412) and tear tests (ASTM D-470). The results are shown in Table 1.

TABLE 1

| EXAMPLE | 1 | 2 | Control-A |
|---|---|---|---|
| PEKK (phr) | 25 | 50 | None |
| Test Temperature 100° C. | | | |
| $T_B$ (MPa) | 5.7 | 5.9 | 2.1 |
| $E_B$ (%) | 60 | 30 | 80 |
| Tear (kN/m) | 2.8 | 2.8 | 1.4 |
| Test Temperature 177° C. | | | |
| $T_B$ (MPa) | 3.8 | 4.8 | 1.2 |
| $E_B$ (%) | 50 | 30 | 40 |
| Tear (kN/m) | 1.0 | 0.7 | 0.7 |
| Melt Index (g/min) | NM* | 6 | 1 |

*Not measured.
where $T_B$ = tensile strength at break (ASTM D-412)
$E_B$ = elongation at break
Tear = tear strength (ASTM D-470)
phr = parts per 100 parts of fluoroelastomer
The control contains no PEKK It can be seen from Table 1 that the cured compositions, in which PEKK was premixed into the fluoroelastomer at 340° C. (Examples 1 and 2), exhibit significantly improved tensile strength and tear strength over Control A.

It is also seen that the composition containing 50 phr PEKK (Example 2) has a greater tendency to flow under the conditions of the Melt Index Test.

Example 3

A fluoroelastomer (TFE/perfluoromethyl vinyl ether/perfluoro-2-phenoxyphenyl ether copolymer) (55/43/1.8 wt. %) was blended in a Brabender Plastograph at 340° C. with the same PEKK copolymer as used in Example 1 at the level of 15 parts PEKK to 100 parts fluoroelastomer. The uniform blend was removed from the Plastograph, cooled to 25° C. and then compounded on a two-roll rubber mill using the following formulation: 115 parts of above blend, 10 parts SAF carbon black, 4 parts lead oxide, 3 parts dipotassium salt of bisphenol AF, 4 parts DCH-18-Crown-6.

Example 4

The fluoroelastomer of Example 4 (TFE/perfluoromethyl vinyl ether/perfluoro-2-phenoxyphenyl ether copolymer) was blended in a Brabender Plastograph at 340° C. with the same PEKK copolymer as used in Example 1 at the level of 30 parts PEKK to 100 parts fluoroelastomer. The uniform blend was removed from the Plastograph, cooled to 25° C. and then compounded on a two-roll rubber mill using the following formulation: 130 parts of above blend, 10 parts SAF carbon black, 4 parts lead oxide, 3 parts dipotassium salt of bisphenol AF, 4 parts DCH-18-Crown-6.

Control B

As a control, the fluoroelastomer of Examples 3 and 4 was blended with curing ingredients on a rubber mill at 100° C. No PEKK was added to this composition. The formulation was as follows: 100 parts fluoroelastomer, 10 parts SAF carbon black, 4 parts lead oxide, 3 parts dipotassium salt of bisphenol AF, parts DCH-18-Crown-6.

The above three compositions were sheeted out, pressed into 0.2 cm thick slabs, cured at 177° C. for 30 minutes and post cured for two days under nitrogen at 288° C. Test pieces were cut from the slabs and were subjected to tensile tests (ASTM D-412) and tear tests (ASTM D-470). The results are shown in Table 2.

TABLE 2

| EXAMPLE | 3 | 4 | Control-B |
|---|---|---|---|
| PEKK (phr) | 15 | 30 | None |
| Test Temperature 25° C. | | | |
| $T_B$ (MPa) | 14.5 | 15.8 | 14.1 |
| $E_B$ (%) | 70 | 50 | 150 |
| Tear (kN/m) | 3.0 | 3.5 | 3.0 |
| Test Temperature 177° C. | | | |
| $T_B$ (MPa) | 2.1 | 3.5 | 1.6 |
| $E_B$ (%) | 60 | 60 | 45 |
| Tear (kN/m) | 1.2 | 1.9 | 0.5 | where $T_B$ = tensile strength at break (ASTM D-412)
$E_B$ = elongation at break
Tear = tear strength (ASTM D-470)
phr = parts per 100 parts of fluoroelastomer
The control contains no PEKK.

It can be seen from Table 2 that the cured compositions, in which PEKK was premixed into the fluoroelastomer at 340° C. (Examples 3 and 4), exhibit significantly improved tensile strength and tear strength over the control at high temperature.

I claim:

1. Melt-blended composition comprising:
   (a) about 100 parts of the fluoroelastomer consisting essentially of polymer repeat units of:
      (i) 55 to 58 wt. % tetrafluoroethylene,
      (ii) 0.4 to 2.0 wt. % of a fluorinated organic comonomer that contains curing sites,
      (iii) 42 to 45 wt. % perfluoromethyl vinyl ether, and
   (b) 5 to 50 parts of a copolymer having as polymer repeat units (oxy-p-phenyleneterephthaloyl-p-phenylene) and oxy-p-phenyleneisophthaloyl-p-phenylene), the ratio of tere-isomer to iso-isomer being within the range 60:40 to 80:20, the copolymer having a inherent viscosity of greater than 0.4.

2. The composition of claim 1 wherein the cure site monomer is selected from the class consisting of vinylidene fluoride, trifluoroethylene, vinyl fluoride, $CH_2=CHR_f$ where $R_f$ is a perfluoroalkyl group containing from 1 to 5 carbon atoms, perfluorophenoxy substituted perfluoroalkylene vinyl ethers wherein the perfluoroalkylene group contains from 1 to 5 carbon atoms, $NC(R'_f-O)_nCF=CF_2$ where $R'_f$ is a perfluoroalkylene group of 2 to 3 carbon atoms and n is 1 to 4 fluoroolefins of 2 to 5 carbon atoms containing 1 or 2 bromo substituents or fluoroolefins of 2 to 5 carbon atoms containing 1 or 2 iodo substituents.

3. The composition of claim 1 wherein curing agents are present.

4. The composition of claim 3 wherein reinforcing fillers are present.

5. The composition of claim 4 wherein the fluoroelastomer has been cured.

6. Articles prepared from the composition of claim 5.

7. Process comprising:
   A. melt blending:
      (1) about 100 parts of the fluoroelastomer consisting essentially of polymer repeat units of:
         (i) 55 to 58 wt. % tetrafluoroethylene,
         (ii) 0.4 to 2.0 wt. % of a fluorinated organic comonomer that contains curing sites, (iii) 42 to 45 wt. % perfluoromethyl vinyl ether, and (2) 5 to 50 parts of a copolymer having as polymer repeat units (oxy-p-phenyleneterephthaloyl-p-phenylene) and oxy-p-phenyleneisophthaloyl-p-phenylene), the ratio of tere-isomer to iso-isomer being within the range 60:40 to 80:20, the copolymer having a inherent visocity of greater than 0.4, at a temperature sufficient to melt A(2);

B. cooling the melt blend produced in step A to below 100° C.;

C. Admixing with the cooled melt blend produced in step B a chemical curing agent for the fluorinated organic comonomer of step A(1)(ii); and D. Curing the fluoroelastomer of step A.

* * * * *